US008688966B2

(12) United States Patent
Curtis et al.

(10) Patent No.: US 8,688,966 B2
(45) Date of Patent: Apr. 1, 2014

(54) SYSTEMS, METHODS, AND COMPUTER-READABLE MEDIA FOR PRESENTING VISUAL CONTENT WITH A CONSISTENT ORIENTATION

(75) Inventors: Robert Curtis, San Jose, CA (US); Jeffery T. Lee, San Jose, CA (US); Shachar Ron, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 777 days.

(21) Appl. No.: 12/873,076

(22) Filed: Aug. 31, 2010

(65) Prior Publication Data

US 2012/0054478 A1 Mar. 1, 2012

(51) Int. Cl.
*G06F 9/00* (2006.01)

(52) U.S. Cl.
USPC .............................................. 713/2; 345/659

(58) Field of Classification Search
USPC .............................................. 713/2; 345/659
See application file for complete search history.

(56) References Cited

U.S. PATENT DOCUMENTS

| | | | | |
|---|---|---|---|---|
| 6,154,214 | A | 11/2000 | Uyehara et al. | |
| 6,466,198 | B1 | 10/2002 | Feinstein | |
| 6,828,962 | B1 | 12/2004 | McConkie et al. | |
| 7,259,772 | B2 | 8/2007 | Koh | |
| RE42,616 | E * | 8/2011 | Kim et al. | 345/649 |
| 2007/0252853 | A1 * | 11/2007 | Park et al. | 345/649 |
| 2008/0209201 | A1 * | 8/2008 | Min et al. | 713/2 |
| 2009/0303177 | A1 | 12/2009 | Chou et al. | |

* cited by examiner

*Primary Examiner* — Albert Wang
(74) *Attorney, Agent, or Firm* — Van Court & Aldridge LLP

(57) ABSTRACT

Systems, methods, and computer-readable media are provided for presenting visual content with a consistent orientation on a display of an electronic device, even when the device is powered down and powered up again. Last known orientation information used by an application program to present application content with a particular orientation can be stored in a preference file that may not be accessible to a boot loader used during a boot process. To ensure that the boot loader may present boot up content with the same particular orientation indicated by the orientation information stored in the preference file, a register accessible to the boot loader can be used to store the same orientation information.

20 Claims, 10 Drawing Sheets

300

310

| Preference File | |
|---|---|
| Language | English |
| Orientation | 270 degrees |
| Font Size | Medium |
| Interface Color | Blue |
| Time Zone | EST |

320

FIG. 3

SYSTEMS, METHODS, AND COMPUTER-READABLE MEDIA FOR PRESENTING VISUAL CONTENT WITH A CONSISTENT ORIENTATION

BACKGROUND OF THE DISCLOSURE

Many electronic devices, such as media players and cellular telephones, often include a display on which visual content can be presented to a user. For example, such visual content can include graphics, images, videos, text, glyphs, and the like for providing information. Depending on the functional state of the device, the visual content may be provided in different ways and may be of different types. For example, when the device is first powered on and is booting up, or when the device is being rebooted, the visual content presented on the display may be "boot up" content that may be provided by a boot loader of the device. Then, once an operating system of the device has been loaded by the boot loader, the visual content presented on the display may be "application content" provided by an application program of the operating system.

The electronic device may present the visual content on the display in various orientations relative to an enclosure of the electronic device so that the content may be appropriately oriented relative to the user regardless of the various orientations in which the device enclosure may be positioned relative to the user. In some cases, the orientation of the displayed application content relative to the device enclosure may be changed by the user (e.g., by providing the device with a user input command) or by data output from a device sensor (e.g., an accelerometer or compass). Some application programs may store information indicative of a particular orientation of displayed application content such that, after rebooting of the device, the application program may once again present application content in the particular orientation indicated by the stored orientation information. However, during the rebooting process, the boot loader may not have access to the stored orientation information and may present boot up content in a default orientation that may be different from the particular orientation indicated by the stored orientation information. Such a difference in the orientation of the visual content presented by the device may be confusing or distracting to a user.

SUMMARY OF THE DISCLOSURE

Systems, methods, and computer-readable media for presenting visual content with a consistent orientation using an electronic device are provided.

For example, in some embodiments, there is provided a method for providing a consistent orientation of displayed visual content. The method may include receiving an instruction to boot up a device. The method may also include retrieving orientation information from a register of the device in response to the received instruction. The orientation information may correspond to an orientation of application content displayed on the device prior to receiving the instruction. The method may also include displaying boot up content on the device using the orientation information retrieved from the register. After displaying the boot up content, the method may also include displaying the application content on the device in the same orientation as the boot up content. For example, the method may include loading an application program using a boot loader of the device, and the application content may be provided by the loaded application content.

In other embodiments, there is provided an electronic device that may includes storage and control circuitry. The control circuitry may be operative to direct an application program to provide application content to a display. The control circuitry may also be operative to receive an instruction to change an orientation of the application content provided to the display to a new orientation relative to the device. Furthermore, the control circuitry may be operative to store orientation information indicative of the new orientation in a preference file used by the application program, where the preference file is stored in a section of the storage, and to store the orientation information in a register that is accessible to a boot loader of the device. In some embodiments, the boot loader may not have access to the section of the storage during a boot process of the device.

In yet some other embodiments, there is provided a method for providing a consistent orientation of displayed visual content. The method may include defining an orientation for displaying application content provided by an application program and storing orientation information indicative of the defined orientation in a first section of memory that may be inaccessible during a boot up process. The method may also include storing the orientation information in a second section of memory that is accessible during the boot up process. Furthermore, the method may include conducting the boot up process using a boot loader that may initially access only the second section of memory. Moreover, the method may include retrieving the orientation information from the second section of memory using the boot loader and displaying boot up content in the defined orientation based on the retrieved orientation information using the boot loader. In some embodiments, the method may also include loading the application program using the boot loader and, in response to loading the application program, displaying the application content under the control of the application program to replace the displayed boot up content.

In still yet some other embodiments, there is provided computer readable media for providing a consistent orientation of displayed visual content. The computer readable media may include computer program logic recorded thereon for receiving an instruction to boot a device, retrieving orientation information from a register, and displaying boot up content on the device using the orientation information retrieved from the register. The orientation information may correspond to an orientation of application content displayed on the device prior to receiving the instruction to boot the device.

BRIEF DESCRIPTION OF THE DRAWINGS

The above and other aspects of the invention, its nature, and various features will be more apparent upon consideration of the following detailed description, taken in conjunction with the accompanying drawings in which like reference characters may refer to like parts, and in which:

FIG. 3 is a view of an illustrative preference file, in accordance with some embodiments of the invention;

DETAILED DESCRIPTION OF THE DISCLOSURE

Systems, methods, and computer-readable media for presenting visual content with a consistent orientation using an electronic device are provided and described with reference to FIGS. 1-10.

Figure 1:
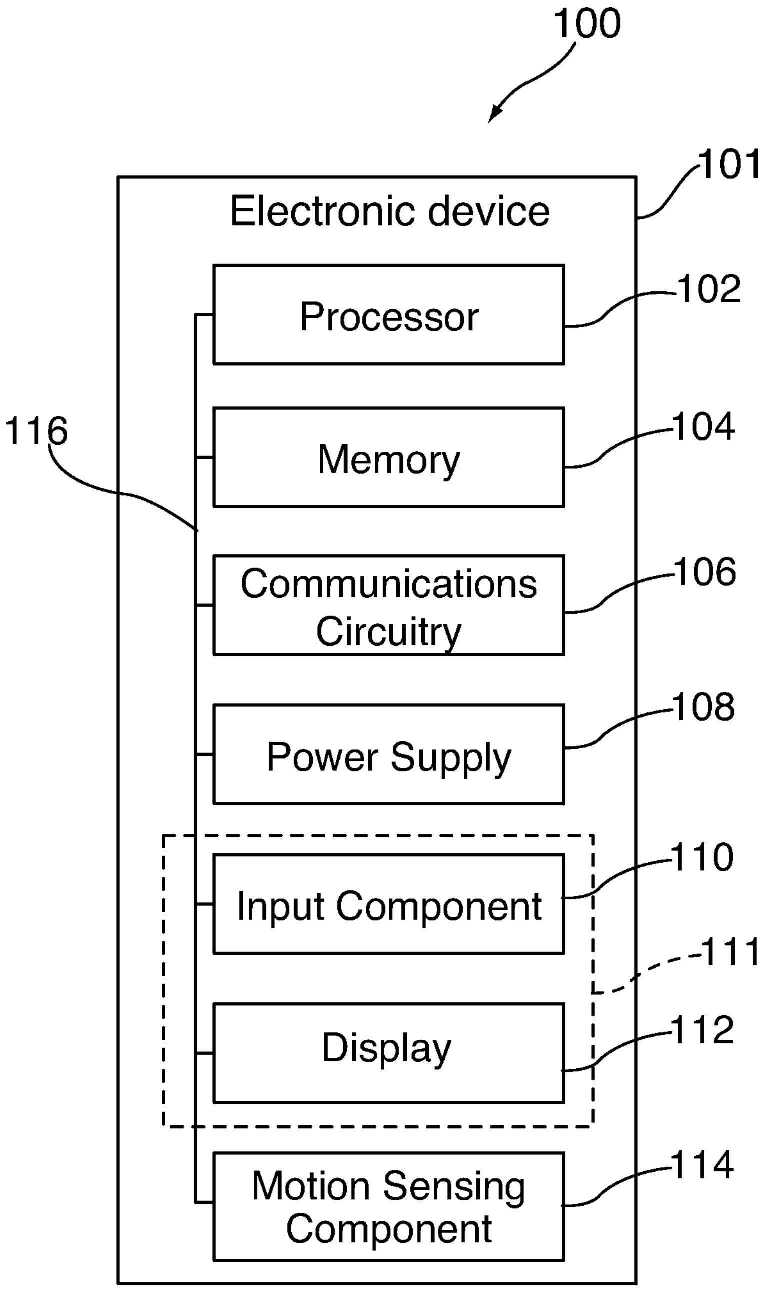
FIG. 1 is a schematic view of an illustrative electronic device for presenting visual content with a consistent orientation, in accordance with some embodiments of the invention.

FIG. 1 is a schematic view of an illustrative electronic device 100 for presenting visual content to a user in accordance with some embodiments of the invention. Electronic device 100 may be any portable, mobile, or hand-held electronic device configured to present visual content to a user wherever the user travels. Alternatively, electronic device 100 may not be portable at all, but may instead be generally stationary. Electronic device 100 can include, but is not limited to, a music player (e.g., an iPod™ available by Apple Inc. of Cupertino, Calif.), video player, still image player, game player, other media player, music recorder, movie or video camera or recorder, still camera, other media recorder, radio, medical equipment, domestic appliance, transportation vehicle instrument, musical instrument, calculator, cellular telephone (e.g., an iPhone™ available by Apple Inc.), other wireless communication device, personal digital assistant, remote control, pager, computer (e.g., a desktop, laptop, tablet, server, etc.), monitor, television, stereo equipment, set up box, set-top box, boom box, modem, router, printer, and combinations thereof. In some embodiments, electronic device 100 may perform a single function (e.g., a device dedicated to presenting visual content) and, in other embodiments, electronic device 100 may perform multiple functions (e.g., a device that presents visual content, plays music, and receives and transmits telephone calls).

Electronic device 100 may include a processor 102, memory 104, communications circuitry 106, power supply 108, input component 110, display 112, and motion sensing component 114. Electronic device 100 may also include a bus 116 that may provide one or more wired or wireless communication links or paths for transferring data and/or power to, from, or between various other components of device 100. In some embodiments, one or more components of electronic device 100 may be combined or omitted. Moreover, electronic device 100 may include other components not combined or included in FIG. 1 and/or several instances of one or more of the components shown in FIG. 1.

Memory 104 may include one or more storage mediums, including for example, a hard-drive, flash memory, non-volatile memory, permanent memory such as read-only memory ("ROM"), semi-permanent memory such as random access memory ("RAM"), any other suitable type of storage component, or any combination thereof. Memory 104 may include cache memory, which may be one or more different types of memory used for temporarily storing data for electronic device application programs. Memory 104 may store media data (e.g., music and image files), software (e.g., a boot loader program, one or more application programs of an operating system for implementing functions on device 100, etc.), firmware, preference information (e.g., media playback preferences), lifestyle information (e.g., food preferences), exercise information (e.g., information obtained by exercise monitoring equipment), transaction information (e.g., information such as credit card information), wireless connection information (e.g., information that may enable device 100 to establish a wireless connection), subscription information (e.g., information that keeps track of podcasts or television shows or other media a user subscribes to), contact information (e.g., telephone numbers and e-mail addresses), calendar information, any other suitable data, or any combination thereof.

Communications circuitry 106 may be provided to allow device 100 to communicate with one or more other electronic devices or servers using any suitable communications protocol. For example, communications circuitry 106 may support Wi-Fi (e.g., an 802.11 protocol), Ethernet, Bluetooth™, high frequency systems (e.g., 900 MHz, 2.4 GHz, and 5.6 GHz communication systems), infrared, transmission control protocol/internet protocol ("TCP/IP") (e.g., any of the protocols used in each of the TCP/IP layers), hypertext transfer protocol ("HTTP"), file transfer protocol ("FTP"), real-time transport protocol ("RTP"), real-time streaming protocol ("RTSP"), secure shell protocol ("SSH"), any other communications protocol, or any combination thereof. Communications circuitry 106 may also include circuitry that can enable device 100 to be electrically coupled to another device (e.g., a computer or an accessory device) and communicate with that other device, either wirelessly or via a wired connection.

Power supply 108 may provide power to one or more of the components of device 100. In some embodiments, power supply 108 can be coupled to a power grid (e.g., when device 100 is not a portable device, such as a desktop computer). In some embodiments, power supply 108 can include one or more batteries for providing power (e.g., when device 100 is a portable device, such as a cellular telephone). As another example, power supply 108 can be configured to generate power from a natural source (e.g., solar power using solar cells).

One or more input components 110 may be provided to permit a user to interact or interface with device 100. For example, input component 110 can take a variety of forms, including, but not limited to, an electronic device pad, dial, click wheel, scroll wheel, touch screen, one or more buttons (e.g., a keyboard), mouse, joy stick, track ball, microphone, camera, proximity sensor, light detector, and combinations thereof. Each input component 110 can be configured to provide one or more dedicated control functions for making selections or issuing commands associated with operating device 100.

Electronic device 100 may also include one or more output components that may present information (e.g., visual, audible, and/or tactile information) to a user of device 100. An output component of electronic device 100 may take various forms, including, but not limited to, audio speakers, headphones, audio line-outs, visual displays, antennas, infrared ports, rumblers, vibrators, or combinations thereof.

For example, electronic device 100 may include display 112 as an output component. Display 112 may include any suitable type of display or interface for presenting visual content to a user. In some embodiments, display 112 may include a display embedded in device 100 or coupled to device 100 (e.g., a removable display). Display 112 may include, for example, a liquid crystal display ("LCD"), a light emitting diode ("LED") display, an organic light-emitting diode ("OLED") display, a surface-conduction electron-emitter display ("SED"), a carbon nanotube display, a nanocrystal display, any other suitable type of display, or combination thereof. Alternatively, display 112 can include a movable display or a projecting system for providing a display of content on a surface remote from electronic device 100, such as, for example, a video projector, a head-up display, or a three-dimensional (e.g., holographic) display. As another example, display 112 may include a digital or mechanical viewfinder, such as a viewfinder of the type found in compact digital cameras, reflex cameras, or any other suitable still or video camera.

In some embodiments, display 112 may include display driver circuitry, circuitry for driving display drivers, or both. Display 112 can be operative to present visual content provided by device 100 (e.g., boot up content that may be provided by a boot loader during any type of booting process of device 100 or application content that may be provided by an application program being run by an operating system of device 100, etc.). Display 112 can be associated with any suitable characteristic geometry defining the size and shape of the display. For example, the display can be rectangular or have any other polygonal shape, or alternatively can be defined by a curved or other non-polygonal shape (e.g., a circular display).

It should be noted that one or more input components and one or more output components may sometimes be referred to collectively herein as an input/output ("I/O") interface (e.g., input component 110 and display 112 as I/O interface 111). It should also be noted that input component 110 and display 112 may sometimes be a single I/O component, such as a touch screen that may receive input information through a user's touch of a display screen and that may also provide visual information to a user via that same display screen.

Electronic device 100 may also be provided with an enclosure or housing 101 that may at least partially enclose one or more of the components of device 100 for protecting them from debris and other degrading forces external to device 100. In some embodiments, one or more of the components may be provided within its own housing (e.g., input component 110 may be an independent keyboard or mouse within its own housing that may wirelessly or through a wire communicate with processor 102, which may be provided within its own housing).

Motion-sensing component 114 may be operative to detect movement of electronic device 100. In some embodiments, motion-sensing component 114 can include one or more three-axis acceleration motion-sensing components (e.g., an accelerometer) that may be operative to detect linear acceleration in three directions. As another example, motion-sensing component 114 can include one or more two-axis acceleration motion-sensing components that may be operative to detect linear acceleration along each of two axes. In some embodiments, motion-sensing component 114 may include an electrostatic capacitance (e.g., capacitance-coupling) accelerometer that may be based on silicon micro-machined micro electro-mechanical systems ("MEMS") technology, including a heat-based MEMS type accelerometer, a piezoelectric type accelerometer, a piezoresistance type accelerometer, or any other suitable accelerometer.

In some embodiments, motion-sensing component 114 can indirectly detect rotation, rotational movement, angular displacement, tilt, position, orientation, motion along a non-linear (e.g., arcuate) path, or any other non-linear motions. For example, if motion-sensing component 114 is a linear motion-sensing component, additional processing can be used to indirectly detect some or all of the non-linear motions. For example, by comparing the linear output of motion-sensing component 114 with a gravity vector (i.e., a static acceleration), motion-sensing component 114 may calculate the tilt of electronic device 100 with respect to a particular axis (e.g., a y-axis). In some embodiments, motion-sensing component 114 may alternatively or additionally include one or more gyro-motion-sensing components or gyroscopes for directly detecting rotational movement. For example, motion-sensing component 114 can include a rotating or vibrating element. As another example, motion-sensing component 114 can include a magnometer operative to detect the orientation of device 100 relative a magnetic north pole. Electronic device 100 may monitor changes in the output of the magnometer to detect rotations of the device. Using motion-sensing component 114, electronic device 100 can determine an orientation of display 112, for example.

Processor 102 of device 100 may include any processing or control circuitry operative to control the operations and performance of one or more components of electronic device 100. For example, processor 102 may be used to run operating system applications, firmware applications, media playback applications, media editing applications, or any other application. In some embodiments, processor 102 may receive input signals from input component 110 and/or drive output signals through display 112. Processor 102 may load a user interface program (e.g., a program stored in memory 104 or another device or server) to determine how instructions or data received via an input component 110 or motion-sensing component 114 may manipulate the way in which information is stored and/or provided to the user via an output component (e.g., display 112).

Electronic device 100 may present visual content on display 112 in various orientations relative to housing 101 so that the visual content may be appropriately oriented relative to a user regardless of the various orientations in which housing 101 may be positioned relative to the user. In some embodiments, the orientation of displayed application content relative to housing 101 of device 100 may be changed by the user (e.g., by providing device 100 with a user input command, such as via input component 110) or by data output from a device sensor (e.g., data output by motion-sensing component 114).

Figure 2A:
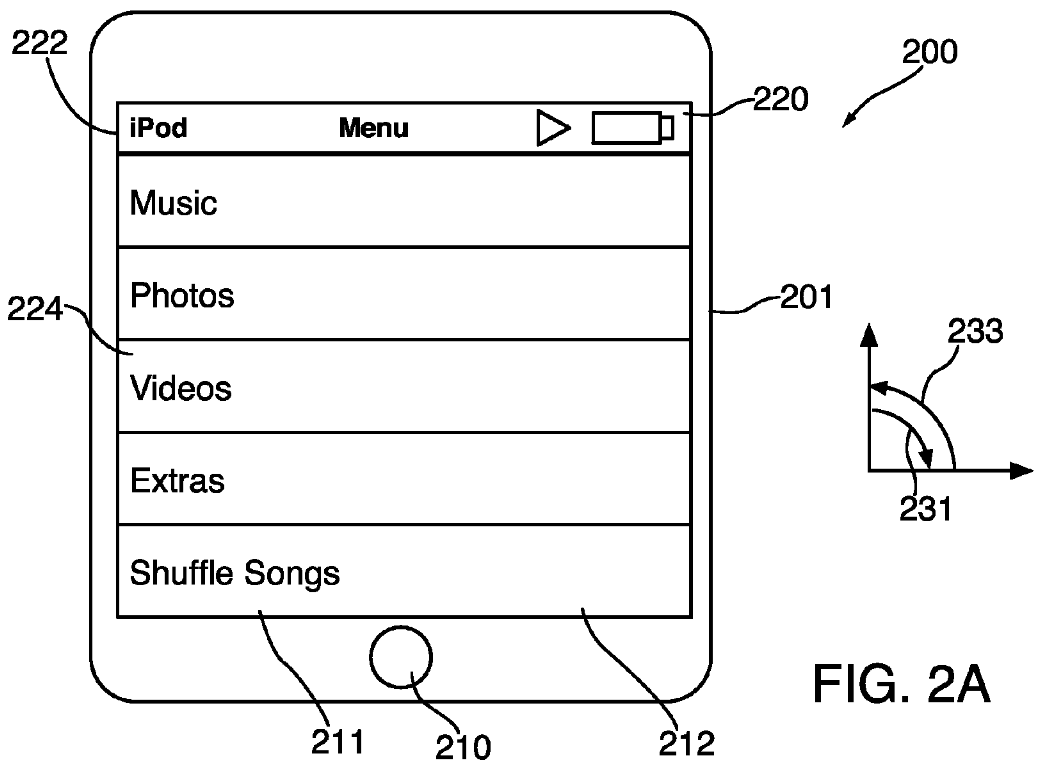
FIG. 2A is an illustrative view of an electronic device presenting application content in a first orientation, in accordance with some embodiments of the invention.
Figure 2B:
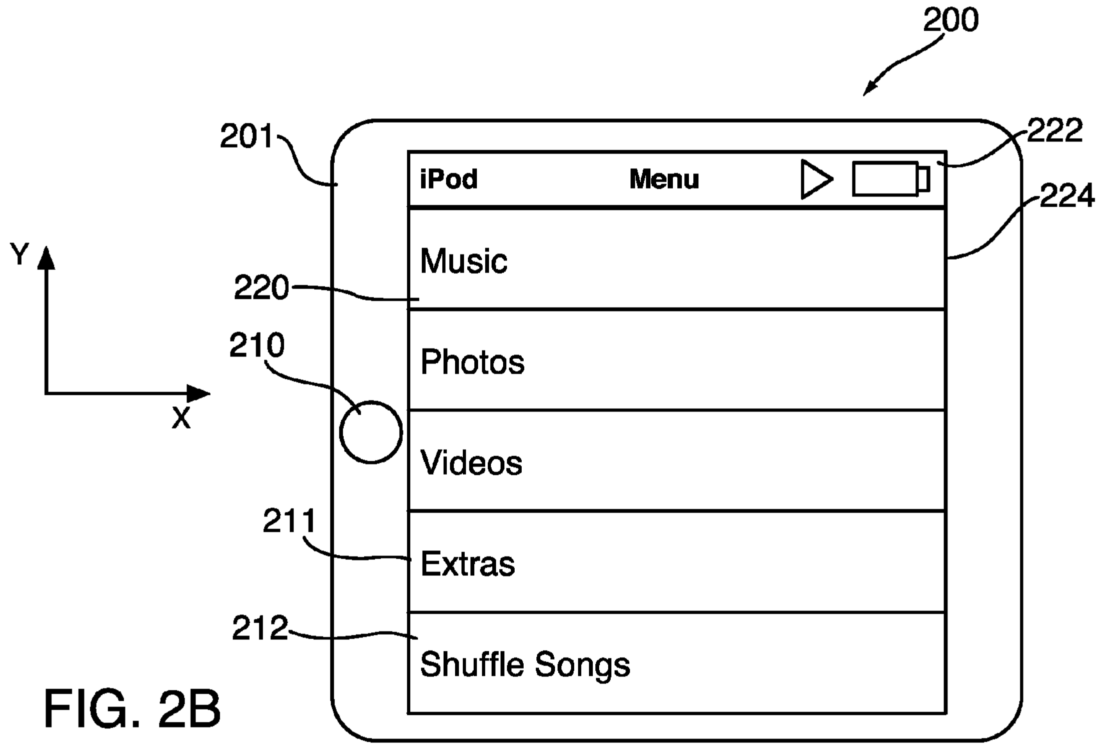
FIG. 2B is an illustrative view of the electronic device of FIG. 2A presenting the application content of FIG. 2A in a second orientation, in accordance with some embodiments of the invention.

FIGS. 2A and 2B are front views of an illustrative electronic device 200 presenting visual content with different orientations in accordance with some embodiments of the invention. Electronic device 200 may include some or all of the features of electronic device 100 of FIG. 1. In particular, electronic device 200 may include a housing 201 that may at least partially expose an input component 210 adjacent an edge 211 of a display 212. As shown in FIGS. 2A and 2B, for example, device 200 may present a screen 220 of visual content on display 212. The visual content of screen 220 may define any suitable type of information that may be presented to a user of device 200. For example, the visual content of screen 220 may be application content that may be provided by an application program of an operating system running on device 200. As another example, the visual content of screen 220 may be application content that may be provided by the operating system running on device 200.

As shown, the visual content of screen 220 can include a title bar portion 222 and a listings portion 224. Each one of title bar portion 222 and listings portion 224 of the visual content of screen 220 can include graphics, images, videos, text, glyphs, and the like for providing information to the user. For example, title bar portion 222 can include various types of information, such as text corresponding to the product type of device 200 (e.g., an "iPod™" available by Apple Inc.), text indicating what part of the currently running application program is being presented (e.g., the "Menu"), and graphic symbols corresponding to status information such as the playback status of device 200 and the amount of battery power remaining on device 200. Listing portion 224 can include various types of information, such as a list of text indicating various options or functionalities of the application program for the user to choose from.

The application content of screen 220 can be presented on display 212 in any suitable orientation relative to device 200 including, for example, a specific orientation that may be required by the application program currently running on device 200. In some embodiments, the visual content of screen 220 can initially be displayed in a "default" orientation relative to one or more physical attributes of housing 200 (e.g., the orientation shown in FIG. 2A). For example, to describe this default orientation of the visual content of screen 220 with some context relative to one or more physical attributes of device 200, the default orientation of FIG. 2A may orient the "bottom" of the visual content (e.g., with respect to the directional flow of the text from left to right) adjacent to edge 211 of display 212 and input component 210.

Such a default orientation may be predefined by the application program providing the visual content of screen 220 (e.g., based on "factory settings" of the application program or device 200). While this default orientation may be perfectly suitable for presenting the visual content in many instances, it might be desirable to change the orientation for various reasons. In some cases, for example, a user may wish to change the orientation of the displayed visual content relative to housing 201 of device 200. For example, if the user rotates device 200 (e.g., within the X-Y plane), the user may likely expect that the displayed visual content will be rotated to match the rotation of device 200.

For example, device 200 may be rotated in the direction of arrow 231 from a first orientation of FIG. 2A to a second orientation of FIG. 2B. As shown, for example, device 200 (e.g., housing 201) may be physically rotated 90 degrees clockwise in the direction of arrow 231 within the X-Y plane from the orientation of FIG. 2A to the orientation of FIG. 2B, but the visual content of screen 220 presented on display 212 may be rotated 90 degrees counterclockwise in the direction of arrow 233 within the X-Y plane. The result of the different rotations is that it may appear to the user as if the visual content of screen 220 has remained in the same orientation relative to the user (e.g., relative to the X-Y plane), even though device 200 itself has been rotated to a new orientation relative to the user and to the visual content. For example, as shown, the new orientation of FIG. 2B may orient the "left side" of the visual content (e.g., with respect to the directional flow of the text from left to right) adjacent to edge 211 of display 212 and input component 210.

It should be noted that the user may be provided with the capability to change the orientation of visual content provided on display 212 relative to device 200 without changing the physical orientation of device 200 itself relative to the user. This may be accomplished through the use of, for example, a two finger rotation gesture on a touch screen implementation of display 212 or a particular input command using input component 210. In some embodiments, a particular orientation of visual content relative to the device may be maintained despite a user changing the orientation of the device relative to the user. For example, the user may be provided with the capability to lock the particular orientation in place through the use of a user-selectable graphic symbol on a touch screen display, such as a slide bar, or it could be accomplished, for example, through the use of a physical orientation-locking switch input component 210 (e.g., like the one found on an iPad™ available by Apple Inc.).

Information indicative of a particular orientation in which application content is to be presented by an associated application program may be stored as orientation information and may be accessed by the application program using any suitable approach. Such orientation information may be indicative of a particular orientation chosen by a user or by any other suitable process, such as by the application program itself. In some embodiments, such orientation information can be stored in a preference file that may be accessed by an application program providing the application content associated with the orientation information.

For example, FIG. 3 shows an illustrative representation of such a preference file 300 in accordance with some embodiments of the invention. Preference file 300 can include any suitable data or other information that may be accessed and used by an application program when the application program is being run by an operating system of an electronic device, such as electronic device 200. As mentioned, information stored in preference file 300 can include information indicative of preferences that the application program may set itself and/or preferences that may be selected by a user. For example, preference file 300 can include a listing of preferences 310 and a listing of corresponding values 320. As shown, preference file 300 may include five different types of preferences with corresponding values, such as, for example: "Language" in which the text or speech of the application program should be presented, "Orientation" in which the application content of the application program should be presented with respect to the device, "Font Size" with which text of the application program should be presented, "Interface Color" on which the color scheme of the application program's application content should be based, and "Time Zone" with which the application program should base its time-sensitive features. Although it is to be understood that any other suitable number and any other suitable types of preferences may be stored in preference file 300.

"Language," for example, may be a selectable preference with which the user can choose between two or more languages. "Orientation" may be a preference that is set by the application program itself (e.g., automatically based on whatever orientation may be required by the application program or based on a change in orientation detected by the application program in response to a user input or data output by a motion-sensing component). For example, with respect to the illustrative embodiment of the application content of screen 220 of FIGS. 2A and 2B, the value of orientation information to be stored in preference file 300 indicative of the particular orientation of FIG. 2B may be "270°" as shown. This value may be used to indicate that the application content of screen 220 is to be rotated 270 degrees clockwise relative to device 200 from its default orientation of FIG. 2A in order to achieve the desired particular orientation of FIG. 2B.

Preference file 300 may be stored with its associated application program, or preference file 300 may be stored as part of a collection of preference files that the electronic device may store for all of its application programs. The information stored in such a preference file may be accessed by an associated application program when that application program is being run by the device. A preference file can be stored in any suitable section of memory including, for example, in non-volatile memory (e.g., in flash memory or in a hard drive). The preference file can be accessed by the application program loaded in RAM when the device is powered on. In some cases, the preference file may not be accessible to the processor of the device until the application program, or the preference file, has been loaded into RAM for processing.

Figure 2C:
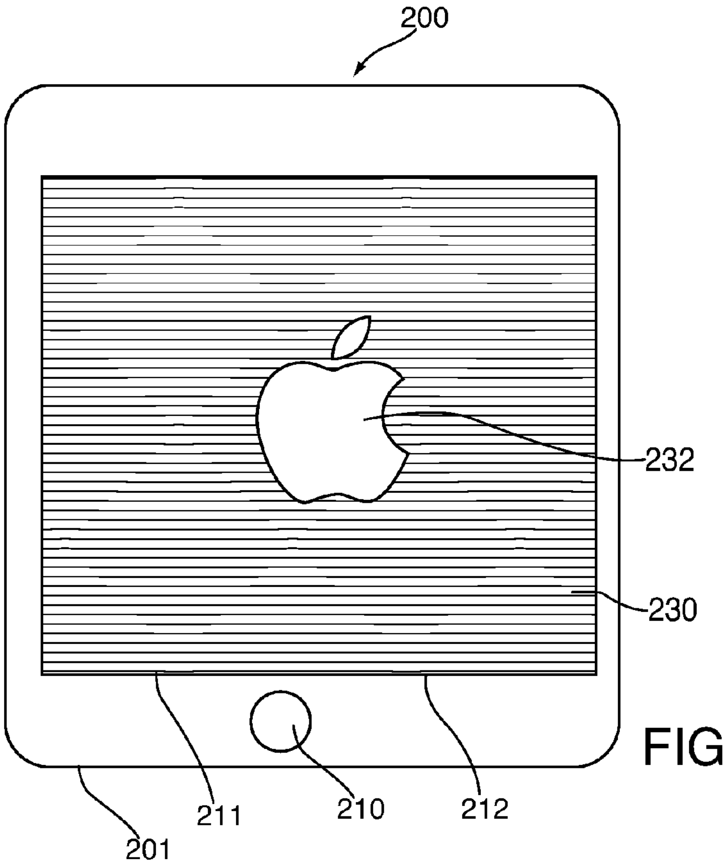
FIG. 2C is an illustrative view of the electronic device of FIGS. 2A and 2B presenting boot up content in a first orientation, in accordance with some embodiments of the invention.
Figure 2D:
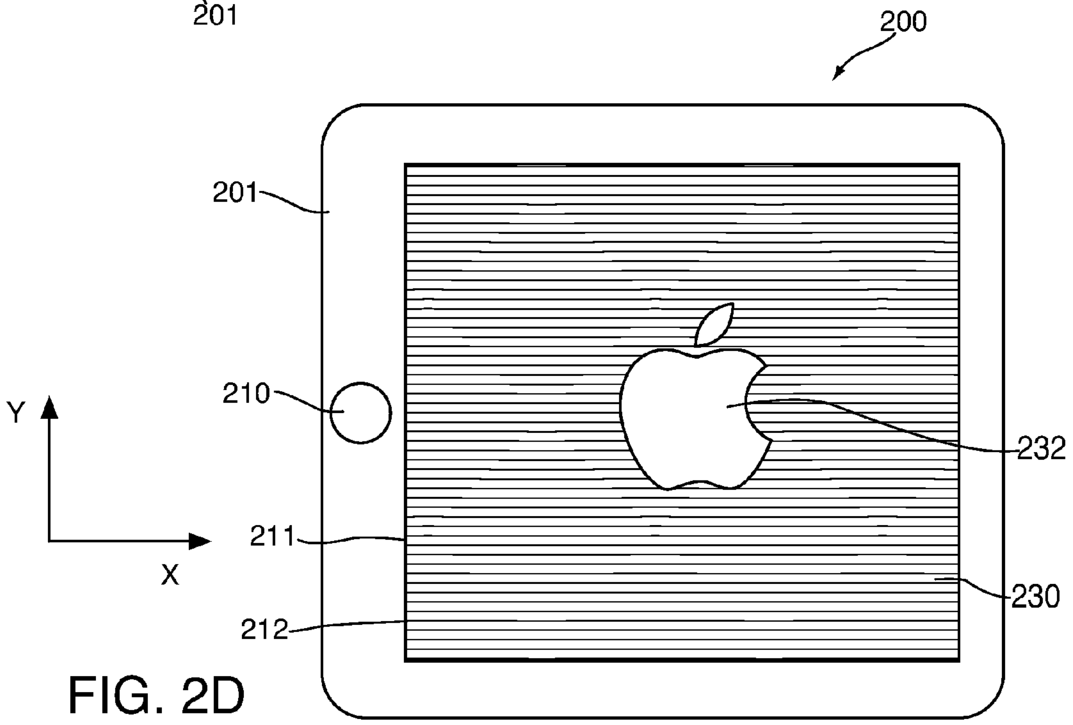
FIG. 2D is an illustrative view of the electronic device of FIGS. 2A-2C presenting the boot up content of FIG. 2C in a second orientation, in accordance with some embodiments of the invention.

FIGS. 2C and 2D are additional front views of electronic device 200 presenting visual information in accordance with some embodiments of the invention. For example, as shown in FIG. 2C, device 200 may present a screen 230 of visual content on display 212. The visual content of screen 230 may define any suitable type of information that may be presented to a user of device 200 during a boot process of device 200. For example, the visual content of screen 230 may be boot up content that may be provided by an executing boot loader of device 200. As shown, the boot up content of screen 230 can include a graphic 232 (e.g., a company logo), although boot up content can include any suitable combination of graphics, images, videos, text, glyphs, and the like for presenting information to the user during a boot process of device 200. A boot loader of device 200 may be a small program executed by device 200 to unload drivers and application programs and to initialize the device for use by a user. When device 200 is initially powered on or booted, the processor may only have access to ROM and RAM, not to non-volatile memory. By storing the boot loader in ROM, the boot loader can be executed to unload drivers and application programs from non-volatile memory to RAM when the device is turned on. In some cases, the boot loader stored in ROM can be limited to loading a secondary boot loader stored in non-volatile memory. The secondary boot loader can be used to unload drivers and application programs of the device. Once loaded to RAM, the device processor can perform operations corresponding to the application programs. Data used by the boot loader to initialize the device, such as boot up content, may also be stored in ROM, or may be stored in distinct registers (e.g., in registers of a power management unit).

In some embodiments, the boot up content of screen 230 can initially be configured to be displayed in a "default" orientation relative to one or more physical attributes of device 200 (e.g., the orientation shown in FIG. 2C). Such a default orientation may maintain the orientation of the boot up content of screen 230 in relation to device 200 regardless of how device 200 may be oriented in relation to the user (e.g., the X-Y plane). For example, to describe this default orientation of the visual content of screen 230 with some context relative to one or more physical attributes of device 200, the default orientation of FIG. 2C may orient the "bottom" of the visual content (e.g., with respect to the context of graphic 232) adjacent to edge 211 of display 212 and input component 210.

In some embodiments, such a default orientation may be predefined by the boot loader providing the visual content of screen 230 (e.g., based on "factory settings" of the boot loader of device 200). While this default orientation may be perfectly suitable for presenting the visual content in many instances, it might be desirable to change the orientation for various reasons. For example, a user may wish to change the orientation of the displayed boot up content relative to device 200 so that it is consistent with the orientation relative to device 200 of application content to be displayed by an application program once the booting process is complete. Therefore, if device 200 is configured to run the application program that provides the application content of screen 220 after the booting process providing the boot up content of screen 230 is complete, then device 200 may also be configured to enable the orientation of boot up screen 230 relative to device 200 to be consistent with the orientation of application screen 220 relative to device 200.

That is, device 200 may be configured to change the orientation of boot up content provided by a boot loader during a boot process so that it is consistent with the orientation of application content to be provided by an application program once the booting process is complete. Otherwise, inconsistent orientations between consecutively presented screens of boot up content and application content may lead to confusion and/or frustration by the user as the device is powered up. However, while the orientation of application content presented by an application program may be determined based on orientation information stored in a preference file (e.g., preference file 300 as described above with respect to the orientation of screen 220 of FIG. 2B), such orientation information may not be accessible to a boot loader for determining a consistent orientation for the boot up content to be presented during a boot process of device 200 (e.g., the orientation for the boot up content of screen 230 as shown in FIG. 2D, whereby the "left side" of the visual content (e.g., with respect to the context of graphic 232) may be adjacent to edge 211 of display 212 and input component 210).

Accordingly, because the orientation information stored in the preference file of an application program may not be accessible by the boot loader during at least a portion of a boot process, an electronic device may be configured to store such orientation information in a section of memory accessible to the boot loader during the boot process (e.g., in registers). For example, this can allow the boot loader to direct a display driver (e.g., as loaded by the boot loader) to display the boot up content in the same orientation as the application content. In some embodiments, the electronic device can include an orientation register that may be used to store such orientation information for use by the boot loader, as shown in electronic device 400 of FIG. 4.

Figure 4:
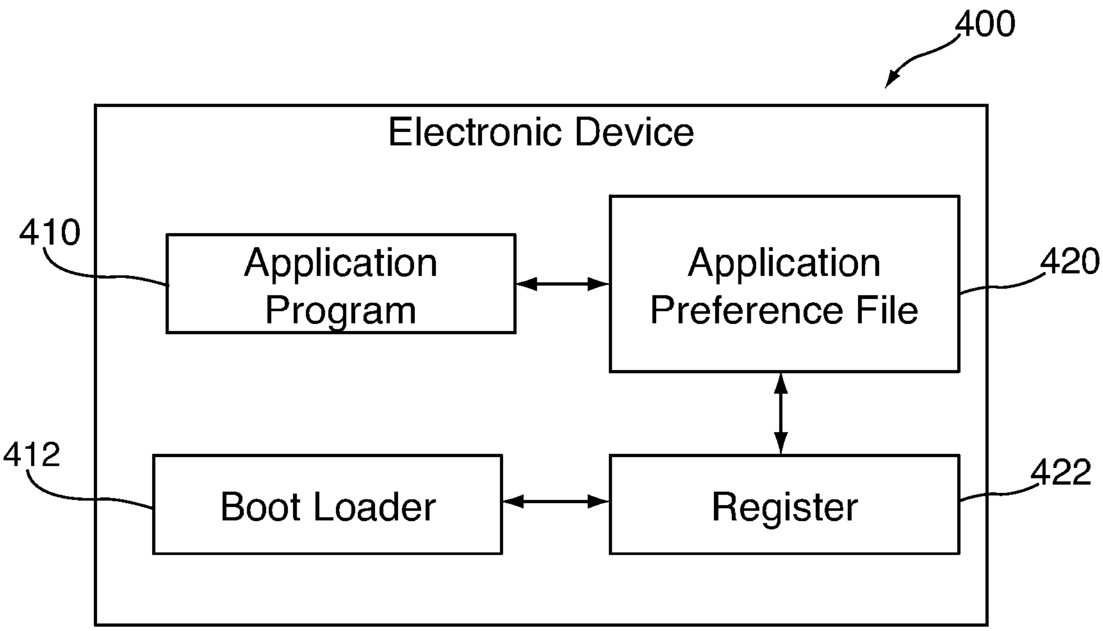
FIG. 4 is an illustrative block diagram of a device having a preference file and a register for storing orientation information, in accordance with some embodiments of the invention.

Electronic device 400 may include some or all of the features of electronic device 100 of FIG. 1 and/or some or all of the features of electronic device 200 of FIGS. 2A-2D. As shown in FIG. 4, electronic device 400 may include at least one application program 410, a corresponding application preference file 420, a boot loader 412, and a boot orientation register 422. Application program 410 and application preference file 420, which may be similar to preference file 300 of FIG. 3, can be stored in non-volatile memory (e.g., a hard drive or flash memory) or in volatile memory that may only be accessible by device 400 once device 400 has completed most, if not all, of a boot process. Boot loader 412 and orientation register 422, on the other hand, can be stored in memory that may be accessible as soon as device 400 is powered on or begins a booting process. Orientation register 422 can be stored, for example, in a power management unit that may be coupled to a battery so that register 422 may remain powered on and persistent or accessible when device 400 is turned off.

Based on the configuration of device 400 shown in FIG. 4, for example, various embodiments can be used to prevent the user from becoming disoriented by varying display orientations of visual content during a boot process. In some embodiments, electronic device 400 can store the last know orientation information for application program 410 in register 422 prior to power down of device 400. Then, during a boot process, the orientation of the boot up content provided by boot loader 412 during the boot process may be determined based on the orientation information stored in register 422. This may ensure that the orientation of the boot up content provided by boot loader 412 and the orientation of the application content provided by application program 410 are consistent.

Because application program 410 and boot loader 412 may retrieve the orientation information for its respective visual content from different sources, device 400 may be configured to ensure that preference file 420 and register 422 store the same information, at least with respect to orientation. Several approaches can be used to ensure that the orientation information of preference file 420 and register 422 remain consistent. In some embodiments, when preference file 420 is written to storage after changing the display orientation (e.g., when an application program changes the orientation of the application content of screen 220 from that of FIG. 2A to that of FIG. 2B), electronic device 400 (e.g., application program 410) can execute a call back to write the changed display orientation information to register 422. This can ensure that the orientation information stored in register 422 changes when the orientation information stored in preference file 420 changes. In any case, changes to orientation could be written to storage as they occur so that the last orientation information utilized by an application program prior to power down is the same orientation information utilized by the boot loader for the next power on or boot cycle.

In some embodiments, other approaches can be used to ensure that the application program and the boot loader make use of the same orientation information. In one implementation, the preference file can be stored in memory accessible to the boot loader (e.g., stored in a register). In this manner, the boot loader can access the orientation information of the preference file when the boot loader initializes the device. When a user changes the orientation of the displayed application content, the electronic device can write a revised preference file with the changed orientation information to the memory accessible to the boot loader.

In some embodiments, the application program can retrieve orientation information from a register located in memory accessible to the boot loader. For example, some or all of the display preference information used by the application program can be stored in a preference file in non-volatile memory, but orientation information can be stored in a register (e.g., of a power management unit). When the orientation of displayed application content is changed, the electronic device can change the orientation information stored in the register.

Figure 5:
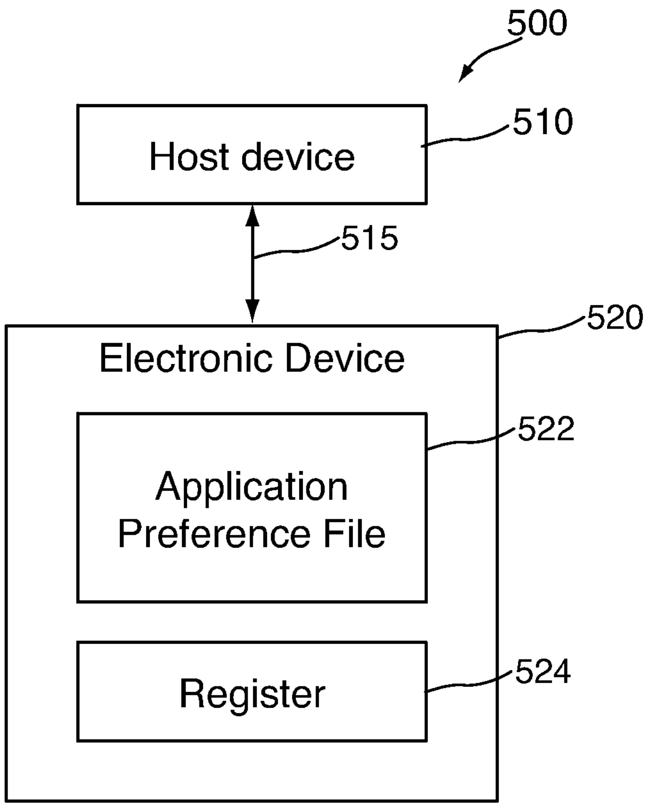
FIG. 5 is an illustrative block diagram of a system in which a host device is coupled to an electronic device, in accordance with some embodiments of the invention.

In some embodiments, a user can change the orientation of displayed information using a device remote from the electronic device itself, as illustrated in FIG. 5. For example, a host device coupled to the electronic device can provide an interface for modifying the manner in which content is displayed by the electronic device. FIG. 5 is a block diagram of an illustrative system 500 in which a host device 510 may be coupled to an electronic device 520 in accordance with some embodiments of the invention. For example, host device 510 may be coupled to electronic device 520 using a communications path 515. As shown, electronic device 520 can include application preference file 522, which may be similar to preference file 420 of FIG. 4 and/or preference file 300 of FIG. 3, and an orientation register 524, which may be similar to orientation register 422 of FIG. 4.

Any suitable circuitry, device, system or combination of these (e.g., a wireless communications infrastructure including communications towers and telecommunications servers) operative to create a communications network providing communications path 515 can be provided. Communications path 515 can enable wireless communications using any suitable short-range or long-range communications protocol. In some embodiments, communications path 515 can by provided over, for example, Wi-Fi (e.g., a 802.11 protocol), Bluetooth (registered trademark), radio frequency systems (e.g., 500 MHz, 5.4 GHz, and 5.6 GHz communication systems), infrared, protocols used by wireless and cellular telephones and personal email devices, or any other protocol supporting wireless communications between host device 510 and electronic device 520. In some embodiments, communications path 515 can instead or in addition include a wired communications path between the devices, for example using any suitable port on one or both of the devices (e.g., 30-pin, USB, FireWire, Serial, or Ethernet).

In some embodiments, host device 510 may include any suitable type of device operative to host a media library and provide media files to electronic device 520 (e.g., provide media files for local playback by electronic device 520). For example, host device 510 may include a computer (e.g., a desktop or laptop computer), a server (e.g., a server available over the Internet or using a dedicated communications link), a kiosk, or any other suitable device. Host device 510 may transfer media files of a media library to an electronic device using any suitable approach. In some embodiments, the host device can run an application dedicated to providing a communications interface between the host device and the electronic device (e.g., iTunes™, available from Apple Inc.). Using the application, a user can define the particular subset of media items from the user's media library to transfer to the electronic device. In some embodiments, the dedicated application can be used to modify or adjust display settings of the electronic device. In particular, host device 510 can provide an instruction to change the orientation of displayed content to electronic device 520 using any suitable approach, and that instruction may come from an application and/or a user.

Figure 6:
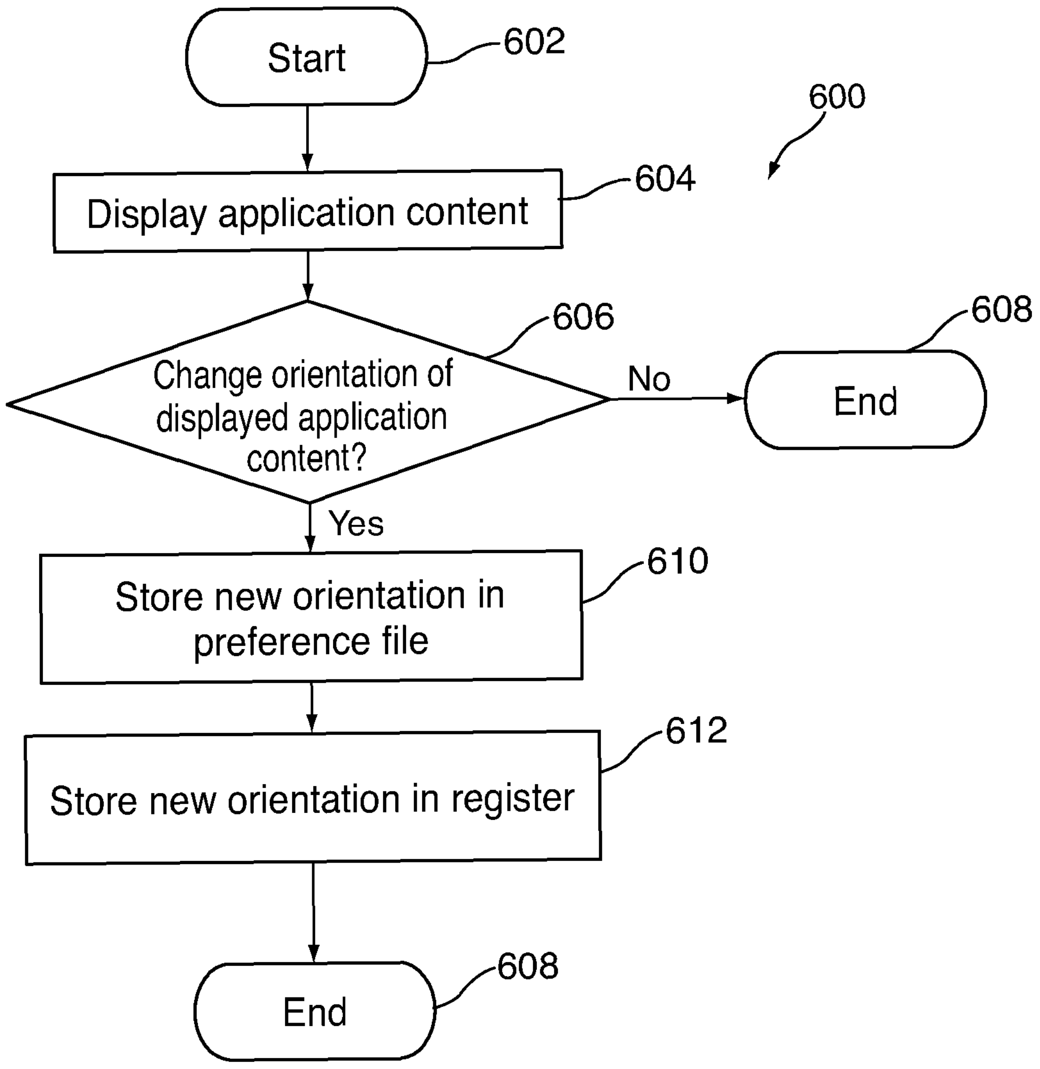
FIG. 6 is a flowchart of an illustrative process for updating orientation information stored in a register, in accordance with some embodiments of the invention.

The following flow charts illustrate several processes used to adjust the orientation of content displayed by an electronic device. FIG. 6 is a flowchart of an illustrative process 600 for updating the orientation information stored in a register in accordance with some embodiments of the invention. Process 600 can begin at step 602. At step 604, an electronic device can display application content. For example, an application program or an operating system of an electronic device can display application content. The application content can be displayed in a particular orientation, such that a user looking at the device from a particular perspective can view the application content in an orientation corresponding to the user's perspective. At step 606, the electronic device can determine whether an instruction to change the orientation of the displayed application content was received. For example, the electronic device can determine whether a user provided an instruction to change an orientation of displayed application content. As another example, the electronic device can determine whether a device sensor has provided an output corresponding to a change in orientation. If the electronic device determines that no instruction to change orientation has been received, process 600 can move to step 608 and end.

If, however, during step 606, it is determined that an instruction to change the orientation of displayed application content was received, process 600 can move to step 610. At step 610, the electronic device can store a changed or new orientation in a preference file. For example, the electronic device can write to storage a preference file that includes orientation information used by the application program. At step 612, the electronic device can store the new orientation in a register. For example, the electronic device can implement a call back that causes the orientation information to be stored in a register that is accessible to a boot loader during the boot up process (e.g., in a register). Process 600 can then end at step 608.

Figure 7:
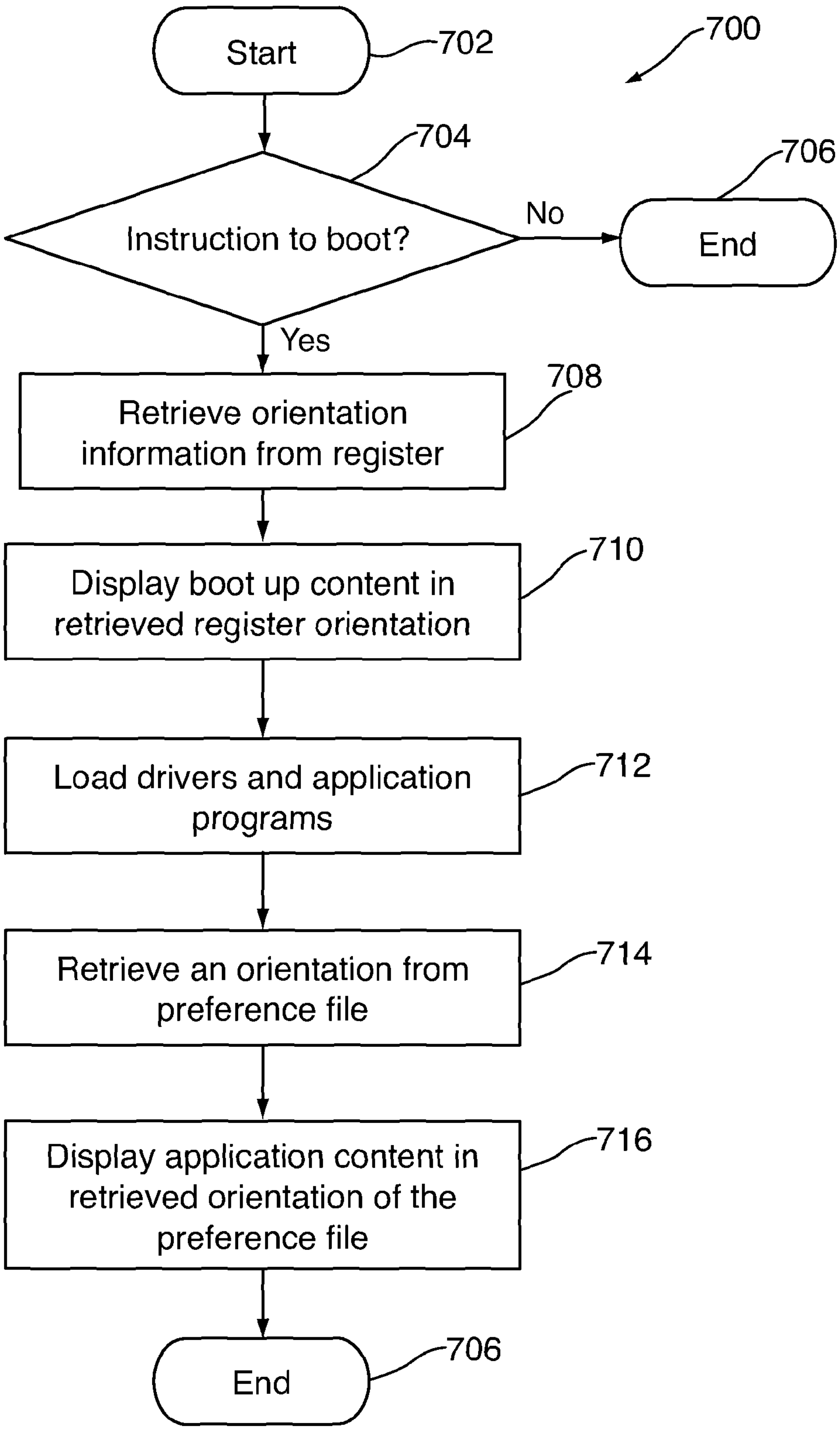
FIG. 7 is a flowchart of an illustrative process for displaying visual content in a particular orientation in accordance with some embodiments of the invention.

FIG. 7 is a flowchart of an illustrative process for displaying visual content in a particular orientation in accordance with some embodiments of the invention. Process 700 can begin at step 702. At step 704, the electronic device can determine whether an instruction to boot was received. For example, the electronic device can determine whether a user pressed a button associated with powering up the device or booting the device in any suitable manner. If the electronic device determines that no instruction to boot the device was received, process 700 can move to step 706 and end. If, at step 704, the electronic device instead determines that an instruction to boot the device was received, process 700 can move to step 708. At step 708, the electronic device can retrieve orientation information from a register. For example, a boot loader of the electronic device can access the appropriate register in which orientation information is stored. At step 710, boot up content can be displayed in the orientation retrieved from the register. For example, the boot loader can display boot up content (e.g., a logo) with an orientation in accordance with the orientation set in the register. At step 712, the electronic device can load drivers and application programs. For example, the boot loader can initialize one or more drivers, and unload one or more application programs used by the device. In some cases, step 712 can take place before or simultaneously with step 710.

At step 714, the electronic device can operate an application program that retrieves an orientation from a preference file. For example, an application program can retrieve orientation information from a preference file corresponding to the application program. The orientation indicated by the orientation information retrieved from the preference file may match or be otherwise consistent with the orientation indicated by the orientation information retrieved from the register (e.g., at step 708). At step 716, the electronic device can display application content in the orientation indicated by the orientation information retrieved from the preference file. For example, the application program can control the display of particular application content in the orientation retrieved from the preference file. Process 700 can then end at step 706.

Figure 8:
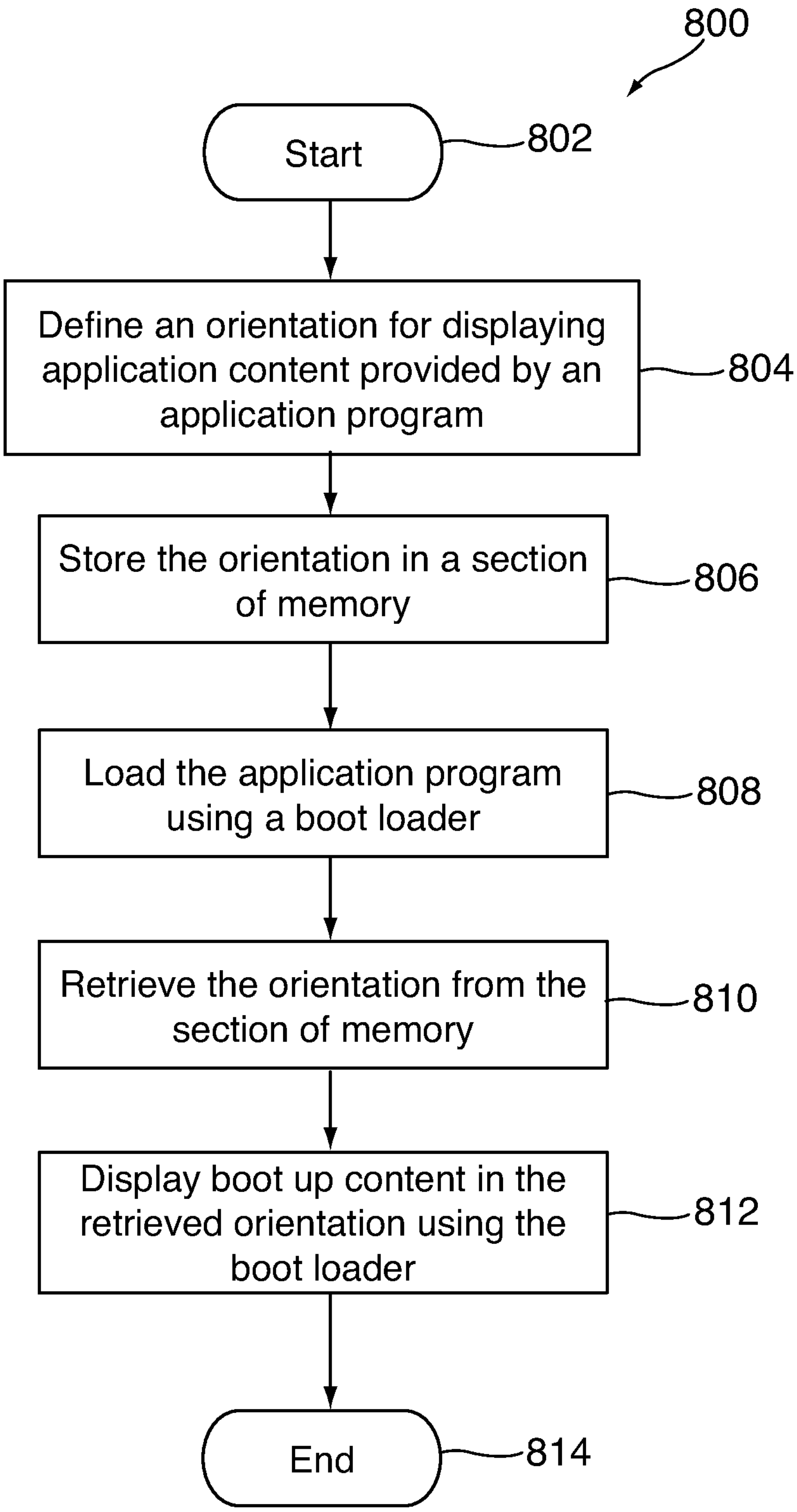
FIG. 8 is a flowchart of an illustrative process for providing a consistent orientation of displayed visual content, in accordance with some embodiments of the invention.

FIG. 8 is a flowchart of an illustrative process for providing a consistent orientation of displayed visual content in accordance with some embodiments of the invention. Process 800 can begin at step 802. At step 804, an electronic device can define an orientation for displaying application content provided by an application program. For example, an application program or operating system can define the orientation for displayed information. At step 806, the electronic device can store orientation information indicative of the defined orientation in a specific section of memory that can be accessed during a boot process of the device. At step 808, the electronic device can load the application program using a boot loader that initially has access only to limited sections of memory. For example, a boot loader initiated when the device is powered on can make use of one or more limited sections of memory to load the application program. At step 810, the electronic device can retrieve the orientation data from the limited section of memory using the boot loader. At step 812, the electronic device can display boot up content in an orientation indicated by the retrieved orientation data. For example, the boot loader can control the display of the boot up content to be in accordance with the retrieved orientation information. Process 800 can then end at step 814.

Figure 9:
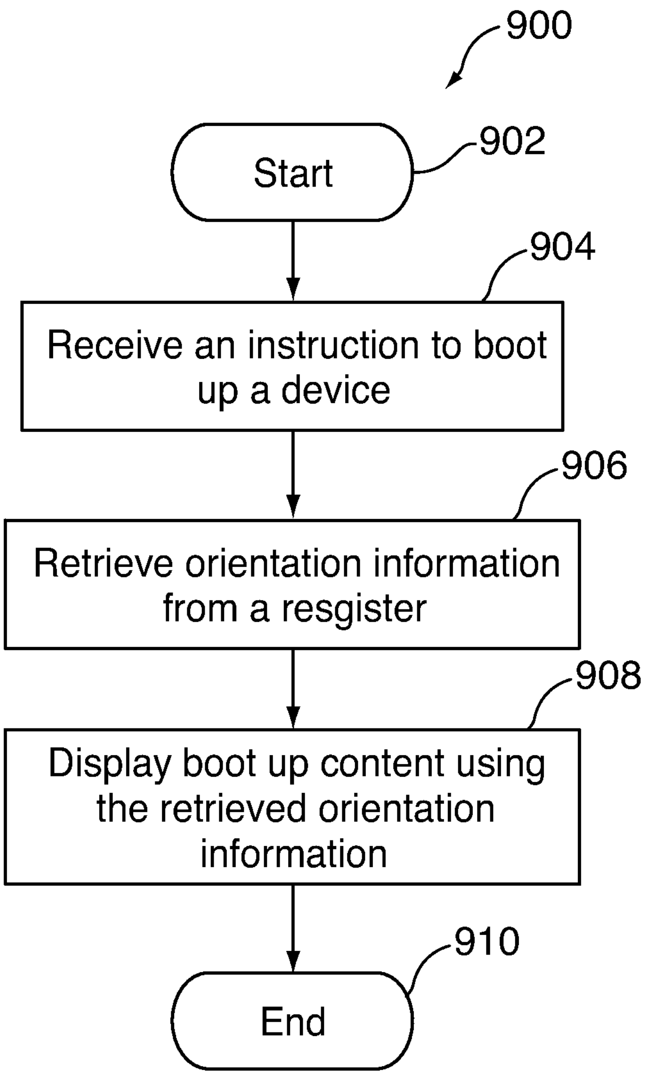
FIG. 9 is a flowchart of an illustrative process for providing a consistent orientation of displayed visual content, in accordance with some embodiments of the invention.

FIG. 9 is a flowchart of an illustrative process for providing a consistent orientation of displayed visual content in accordance with some embodiments of the invention. Process 900 can begin at step 902. At step 904, an electronic device can receive an instruction to boot up a device. For example, an electronic device can receive an instruction to restart or turn on a device. At step 906, the electronic device can retrieve orientation information from a register. The orientation information can correspond to an orientation relative to an enclosure of the device of application content displayed on the device prior to turning off the device. For example, the orientation can correspond to the orientation of the last application content displayed for the user before the device was powered down. At step 908, the electronic device can display boot up content on the device using the orientation information retrieved from the register. For example, the electronic device can display a graphic or logo in the orientation indicated by the orientation information stored in the register. Process 900 can then end at step 910.

Figure 10:
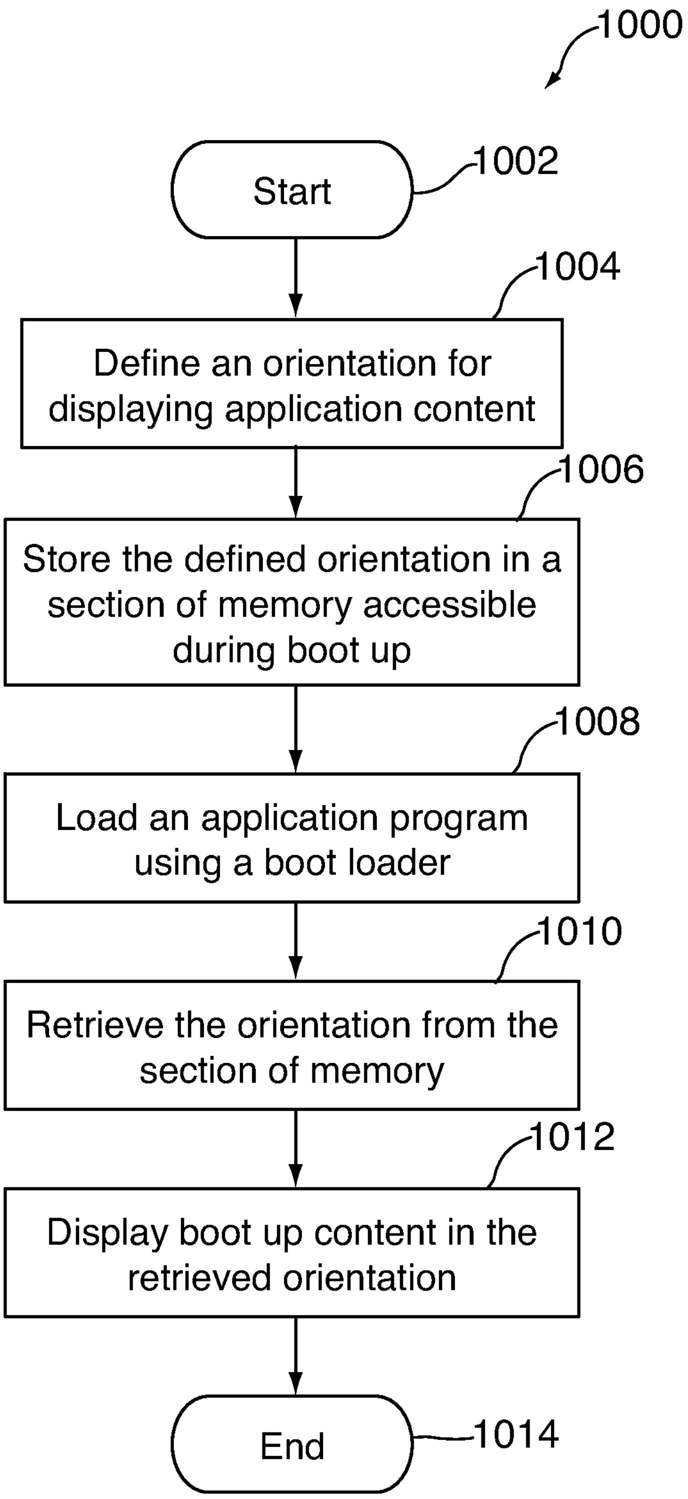
FIG. 10 is a flowchart of an illustrative process for providing a consistent orientation of displayed visual content, in accordance with some embodiments of the invention.

FIG. 10 is a flowchart of an illustrative process for providing a consistent orientation of displayed visual content in accordance with some embodiments of the invention. Process 1000 can begin at step 1002. At step 1004, an electronic device can define an orientation for displaying application content provided by an application program. The orientation, which may be defined relative to an enclosure or any other suitable physical feature of the device, can be set by a user, or determined from the output of a device sensor. Orientation information indicative of the orientation can be stored in a first section of memory that is inaccessible during boot up (e.g., stored in non-volatile memory). At step 1006, the electronic device can store the orientation information in a second section of memory that is accessible during boot up. For example, the orientation information can be stored in a register. At step 1008, the electronic device can load the application program using a boot loader, where the boot loader may initially have access only to the second section of memory. For example, the electronic device can direct the boot loader to unload the application program from non-volatile storage to RAM so that the device processor can execute the application program. At step 1010, the electronic device can retrieve the orientation information from the second section of memory using the boot loader. For example, the electronic device can direct the boot loader to access the orientation information stored in a register of a power management unit. At step 1012, the electronic device can display boot up content in an orientation based on the retrieved orientation information using the boot loader. For example, the electronic device can direct the boot loader to display a graphic or logo in the orientation indicated by the retrieved orientation relative to the device enclosure. Process 1000 can end at step 1014.

It is to be understood that the steps shown in each one of processes 600-1000 of FIGS. 6-10, respectively, are merely illustrative and that existing steps may be modified or omitted, additional steps may be added, and the order of certain steps may be altered.

Moreover, the processes described with respect to FIGS. 6-10, as well as any other aspects of the invention, may each be implemented in hardware or a combination of hardware and software. Embodiments of the invention can also be embodied as computer readable code on a computer readable medium. The computer readable medium may be any data storage device that can store data which can thereafter be read by a computer system. Examples of the computer readable medium include read-only memory ("ROM"), random-access memory ("RAM"), CD-ROMs, DVDs, magnetic tape, and optical data storage devices. The computer readable medium can also be distributed over network-coupled computer systems so that the computer readable code may be stored and executed in a distributed fashion.

Although many of the embodiments of the present invention are described herein with respect to personal computing devices, it should be understood that the present invention is not limited to personal computing applications, but is generally applicable to other applications.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The above-described embodiments of the invention are presented for purposes of illustration and not of limitation.

What is claimed is:

1. A method for providing a consistent orientation of displayed visual content, comprising:
- receiving an instruction to boot up a device;
- retrieving orientation information from a register of the device in response to the received instruction, the orientation information corresponding to an orientation of application content displayed on the device prior to receiving the instruction; and
- during a boot process of the device, displaying boot up content on the device in the orientation using the orientation information retrieved from the register.

2. The method of claim 1, further comprising:
- after displaying the boot up content, displaying the application content on the device in the same orientation as the boot up content.

3. The method of claim 2, wherein displaying the application content further comprises:
- loading an application program using a boot loader of the device; and
- providing the application content using the loaded application program.

4. The method of claim 1, further comprising:
- identifying a current orientation of the application content prior to receiving the instruction; and
- storing the identified current orientation in the register.

5. The method of claim 1, wherein displaying boot up content further comprises:
- loading a display driver using a boot loader; and
- using the display driver to display the boot up content.

6. The method of claim 1, wherein:
- the orientation information is first stored as part of a preference file used by an application program.

7. The method of claim 1, wherein:
- the register is associated with a power management unit.

8. The method of claim 1, further comprising:
- displaying the boot up content until:
  - an application program is loaded; and
  - the loaded application program is able to access a memory location where the orientation information is stored.

9. An electronic device, comprising storage and control circuitry, the control circuitry operative to:
- direct an application program to provide application content to a display;
- receive an instruction to change the orientation of the application content provided to the display to a new orientation relative to the device;
- store orientation information indicative of the new orientation in a preference file used by the application program, wherein the preference file is stored in a section of the storage; and
- store the orientation information in a register that is accessible to a boot loader of the device.

10. The electronic device of claim 9, wherein:
- the boot loader does not have access to the section of the storage during a boot process of the device.

11. The electronic device of claim 9, wherein the control circuitry is further operative to:
- provide the orientation information from the preference file to the register.

12. The electronic device of claim 9, wherein the control circuitry is further operative to:
- direct the application program to change the orientation of the application content provided to the display in response to receiving the instruction.

13. The electronic device of claim 9, wherein the control circuitry is further operative to:
- receive the instruction from an input component of the device.

14. The electronic device of claim 9, wherein the control circuitry is further operative to:
- receive the instruction as an output from a sensing component.

15. The electronic device of claim 14, wherein the control circuitry is further operative to:
- determine that a lock preventing a change in orientation based on the output of the sensing component is disabled.

16. A method for providing a consistent orientation of displayed visual content, comprising:
- defining an orientation for displaying application content provided by an application program;
- storing orientation information indicative of the defined orientation in a first section of memory that is inaccessible during a boot up process;
- storing the orientation information in a second section of memory that is accessible during the boot up process;
- conducting the boot up process using a boot loader, wherein the boot loader initially has access only to the second section of memory;
- retrieving the orientation information from the second section of memory using the boot loader; and
- displaying boot up content in the defined orientation based on the retrieved orientation information using the boot loader.

17. The method of claim 16, further comprising:
- loading the application program using the boot loader; and
- displaying the application content under the control of the application program to replace the displayed boot up content in response to loading the application program.

18. The method of claim 17, further comprising:
- retrieving the orientation information from the first section of storage using the application program; and wherein displaying application content under the control of the application program further comprises displaying the application content in the defined orientation based on the orientation information retrieved from the first section of storage.

19. The method of claim 17, further comprising:

receiving, using the application program, an instruction to change the orientation of the displayed application content to a new orientation;

storing new orientation information indicative of the new orientation in a preference file stored in the first section of memory; and storing the new orientation information in a register of the second section of memory.

20. A non-transitory computer readable media for providing a consistent orientation of displayed visual content, the non-transitory computer readable media comprising computer program logic recorded thereon for:

receiving an instruction to boot a device;

retrieving orientation information from a register, the orientation information corresponding to an orientation of application content displayed on the device prior to receiving the instruction; and during a boot process of the device, displaying boot up content on the device in the orientation using the orientation information retrieved from the register.

* * * * *